United States Patent [19]

Okamoto et al.

[11] Patent Number: 5,125,097
[45] Date of Patent: Jun. 23, 1992

[54] DATA FLOW TYPE INFORMATION PROCESSORS WHERE DATA PACKETS PASS THROUGH PLURALITY OF MERGING AND BRANCHING PORTIONS OF THE INTERNAL PATH

[75] Inventors: Toshiya Okamoto, Kyoto; Satoshi Matsumoto, Nara; Daisuke Azuma, Tenri, all of Japan

[73] Assignee: Sharp Kabushiki Kaisha, Osaka, Japan

[21] Appl. No.: 301,586

[22] Filed: Jan. 26, 1989

[30] Foreign Application Priority Data

Jan. 29, 1988 [JP] Japan ................................. 63-20185
Jan. 29, 1988 [JP] Japan ................................. 63-20186

[51] Int. Cl.⁵ .............................................. G06F 9/00
[52] U.S. Cl. ............................. 395/800; 364/232.22; 364/261.3; 364/259; 364/931.11; 364/938; 364/DIG. 1
[58] Field of Search ... 364/200 MS File, 900 MS File

[56] References Cited

U.S. PATENT DOCUMENTS

| | | | |
|---|---|---|---|
| 4,153,932 | 5/1979 | Dennis et al. | 364/200 |
| 4,156,903 | 5/1979 | Barton et al. | 364/200 |
| 4,591,979 | 5/1986 | Iwashita | 364/200 |
| 4,660,143 | 4/1987 | King et al. | 364/200 |
| 4,675,806 | 6/1987 | Uchida | 364/200 |
| 4,841,436 | 6/1989 | Asan et al. | 364/200 |
| 4,943,916 | 7/1990 | Asano et al. | 364/200 |
| 4,965,715 | 10/1990 | Yoshida | 364/200 |
| 4,972,314 | 11/1990 | Getzinger et al. | 364/200 |
| 4,972,315 | 11/1990 | Yamasaki et al. | 364/200 |

*Primary Examiner*—Thomas C. Lee
*Assistant Examiner*—Ayni Mohamed

[57] ABSTRACT

A data flow type information processor includes a program storing portion, a paired data detecting portion, an operation processing portion, an internal data buffer, and an external data memory. A data packet processed in the program storing portion, the paired data detecting portion and the operation processing portion is transferred to the internal data buffer. On the other hand, a data packet outputted from the external data memory is transferred to another information processor through a merge portion, a branch portion, another merge portion and another branch portion. Thus, internal processing through the internal data buffer and processing from the external data memory to the exterior are not merged.

11 Claims, 9 Drawing Sheets

DATA FLOW TYPE INFORMATION PROCESSORS WHERE DATA PACKETS PASS THROUGH PLURALITY OF MERGING AND BRANCHING PORTIONS OF THE INTERNAL PATH

BACKGROUND OF THE INVENTION

1. Field of the Invention

The present invention relates generally to a data flow type information processor and a data processing method in the information processor, and more particularly, to a data flow type information processor including an external storage and a data processing method in the information processor.

2. Description of the Background Art

In a conventional von Neumenn computer, various instructions are stored in advance as programs in a program memory, and addresses in the program memory are sequentially specified by a program counter so that the instructions are sequentially read out, whereby the instructions are executed.

On the other hand, a data flow type information processor is one type of a non-von Neumenn computer having no concept of sequential execution of instructions by a program counter. Such a data flow type information processor employs architecture based on parallel processing of instructions. In the data flow type information processor, immediately after data which are objects of an operation are collected, an instruction can be executed and a plurality of instructions are simultaneously driven by the data, so that programs are executed in parallel in accordance with the natural flow of the data. As a result, it is considered that the time required for executing operations is significantly reduced.

FIG. 1 is a block diagram showing one example of a structure of a conventional data flow type information processor, and FIG. 2 is a diagram showing one example of a field structure of a data packet processed by the information processor.

Referring now to FIGS. 1 and 2, description is made of a structure and a schematic operation of the conventional data flow type information processor. A destination field in the data packet shown in FIG. 2 stores destination information, an instruction field stores instruction information, and a data 1 field or a data 2 field stores operand data.

In FIG. 1, a program storing portion 1 includes a program memory (not shown). A data flow program including destination information and instruction information is stored in the program memory, as shown in FIG. 3. The program storing portion 1 reads out one of the destination information and one of the instruction information by addressing based on the destination information of the data packet, stores the information in the destination field and the instruction field of the data packet, respectively, and outputs the data packet.

A paired data detecting portion 2 queues data packets inputted from the program storing portion 1. More specifically, the paired data detecting portion 2 detects two data packets having the same destination information, stores operand data of one data packet in a predetermined data field of the other data packet, and outputs the other data packet. On this occasion, the above described one data packet disappears. An operation processing portion 3 decodes the instruction information of the data packet inputted from the paired data detecting portion 2, performs predetermined operation processing with respect to the operand data therein, stores the result of the operation processing in the data field of the data packet, and outputs the data packet to a branch portion 4.

The branch portion 4 outputs the data packet to an internal data buffer 5 or an external data memory 6 based on the destination information in the data packet. The data packet outputted from the internal data buffer 5 or the external data memory 6 is applied to a merge portion 7. The merge portion 7 applies the data packets to the program storing portion 1 in the order of arrival.

In the data flow type information processor shown in FIG. 1, the data packet continues to circulate through the program storing portion 1, the paired data detecting portion 2, the operation processing portion 3, the branch portion 4, the internal data buffer 5 or the external data memory 6 and the merge portion 7, so that operation processing based on the program stored in the program storing portion 1 progresses.

FIG. 4 is a diagram showing a schematic structure of the program storing portion 1 shown in FIG. 1. In FIG. 4, an input data latching portion 11 holds destination information in a data packet. On this occasion, instruction information disappears. Meanwhile, the input data latching portion 11 latches operand data. The destination information latched in the input data latching portion 11 is applied to an address calculating portion 12. In the address calculating portion 12, an address in a program memory 13 is calculated based on the destination information. The program memory 13 stores the data flow program including the destination information and the instruction information as shown in FIG. 3. New destination information and instruction information read out from the program memory 13 in response to the above described address are applied to an output data latching portion 14, to be latched therein. Meanwhile, the output data latching portion 14 latches the operand data latched in the input data latching portion 11 without any modification.

A plurality of data flow type information processors each having the above described structure are coupled to each other, to constitute a multiprocessor system. If and when a data packet outputted from an external data memory 6 in one information processor is sent to another information processor in this multiprocessor system, the data packet must pass through a path for internal processing. More specifically, the data packet outputted from the external data memory 6 is sent to another information processor from a branch portion 4 through a merge portion 7, a program storing portion 1, a paired data detecting portion 2 and an operation processing portion 3. Thus, internal processing through an internal data buffer 5, the program storing portion 1 and the like and processing from the external data memory 6 to the exterior are merged in the merge portion 7. Therefore, the speed of the internal processing and the speed of the processing to the exterior are reduced.

Therefore, it is considered that an output of an external data memory 6 is directly connected to another information processor without passing through a merge portion 7 as shown in FIG. 5. In this case, internal processing through an internal data buffer 5, a program storing portion 1 and the like and processing from the external data memory 6 to the exterior are not merged. However, the problem occurs in that a data packet processed by the external data memory 6 cannot be directly used in the internal processing without passing through another information processor.

Additionally, if and when a data packet is sent to one information processor from another information processor and sent to still another information processor in this multiprocessor system, the data packet is inputted to a merge portion 7 and outputted from a branch portion 4. Thus, the data packet always passes through the program storing portion 1, a paired data detecting portion 2 and an operation processing portion 3. Therefore, internal processing in which a data packet passes through the internal data buffer 5 or the external data memory 6 and processing in which a data packet is sent from the exterior to the exterior are merged. Consequently, additional time is required for sending an externally applied data packet to still another information processor, which delays the internal processing.

SUMMARY OF THE INVENTION

An object of the present invention is to increase the speed of processing in a data flow type information processor.

Another object of the present invention is to avoid merging of a plurality of processing in a data flow type information processor.

Still another object of the present invention is to provide a data flow type information processor in which internal processing and processing from external storing means to the exterior are not merged and a data packet outputted from the external storing means can be used in the internal processing.

Still another object of the present invention is to provide a data flow type information processor in which processing of further sending an externally applied data packet to the exterior and internal processing are not merged.

Still another object of the present invention is to provide a data processing method in which the speed of processing can be increased in a data flow type information processor.

A further object of the present invention is to increase the speed of processing in a multiprocessor system comprising a plurality of data flow type information processors.

A still further object of the present invention is to decrease merging of a plurality of processing in a multiprocessor system.

In order to attain the above described object, the data flow type information processor according to the present invention comprises internal processing means for performing operation processing of data according to a data flow program, external storing means for storing data, first merge means for receiving data from the external storing means, first branch means for receiving the data from the first merge means, second merge means for receiving the data from the internal processing means, and second branch means for receiving the data from the second merge means. The first merge means selectively applies to the first branch means the data applied from the external storing means and data applied from the exterior. The first branch means selectively applies to the internal processing means or the second merge means the data applied from the first merge means. The second merge means selectively applies to the second branch means the data applied from the first branch means or the data applied from the internal processing means. The second branch means selectively outputs to the external storing means or the exterior the data applied from the second merge means.

In the information processor according to the present invention, if and when the data from the internal processing means is sent to the external memory means, the data passes through the second merge means and the second branch means. When the data from the external storing means is sent to the exterior, the data passes through the first merge means, the first branch means, the second merge means and the second branch means. In addition, when the data from the external storing means is sent to the internal processing means, the data passes through the first merge means and the first branch means. Thus, the data from the external storing means can be outputted to the exterior without passing through the internal processing means, so that internal processing performed in the internal processing means and processing from the external processing means to the exterior can be prevented from being merged.

As described in the forgoing, according to the present invention, the processing from the external processing means to the exterior and the internal processing performed in the internal processing means can be prevented from being merged, so that the speed of accessing data is increased.

In accordance with another aspect of the present invention, the data flow type information processor comprises internal processing means for performing operation processing of data according to a data flow program, external storing means for storing data, first branch means for receiving data from the exterior, first merge means for receiving the data from the first branch means, second branch means for receiving the data from the internal processing means, and second merge means for receiving the data from the second merge means. The first branch means selectively applies to the first merge means or the second merge means the data from the exterior. The first merge means selectively applies to the internal processing means the data applied from the external storing means or the data applied from the first branch means. The second branch means selectively applies to the external storing means or the second merge means the data applied from the internal processing means. The second merge means selectively outputs to the exterior the data applied from the second branch means or the data applied from the first branch means.

In the above described data flow type information processor, if and when the data from the internal processing means is sent to the external storing means, the data passes through the second branch means. When the data from the external storing means is sent to the internal processing means, the data passes through the first merge means. When the data from the exterior is further sent to the exterior, the data passes through the first branch means and the second merge means. Thus, the data from the exterior can be outputted to the exterior without passing through the internal processing means, so that processing from the exterior to the exterior and internal processing performed in the internal processing means and internal processing through the external storing means can be prevented from being merged.

As described in the forgoing, according to the present invention, the processing from the exterior of the information processor to the exterior and the internal processing performed in the internal processing means can be prevented from being merged, so that the speed of accessing data is increased.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Referring now to the figures, the embodiment of the present invention will be described in detail.

Figure 6:
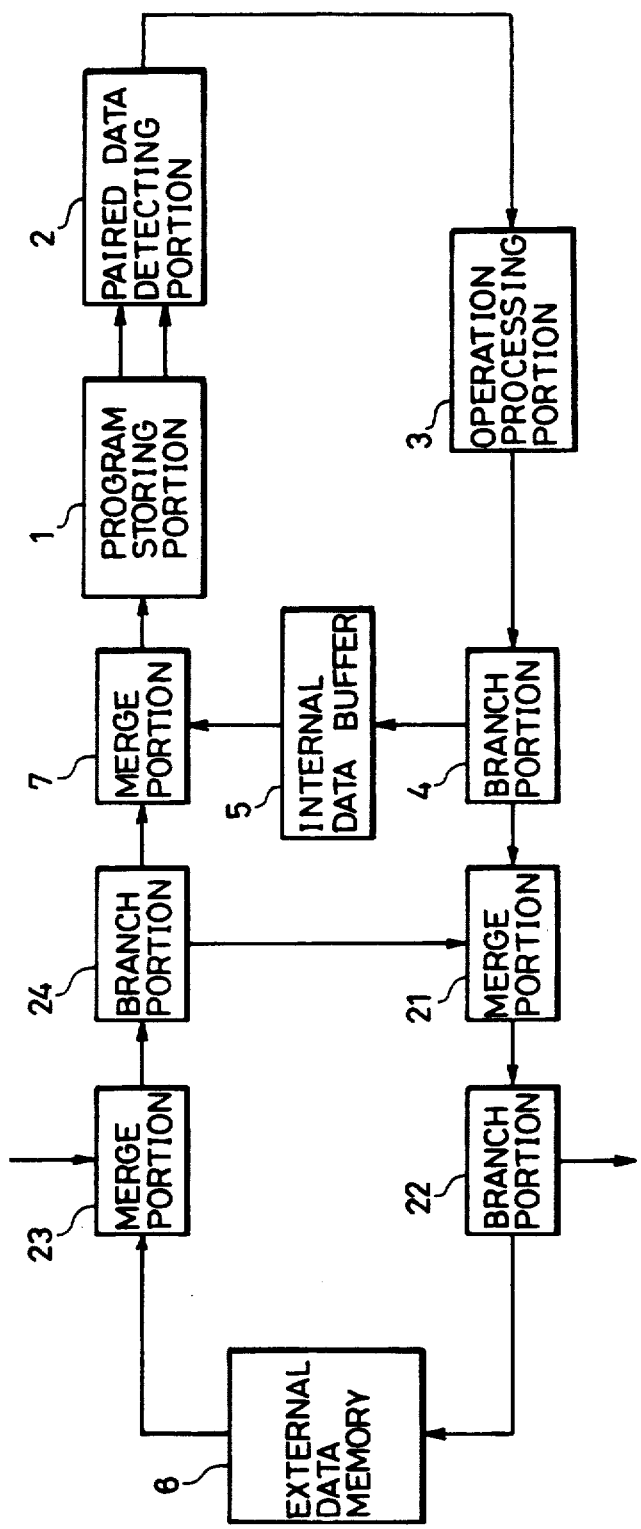
FIG. 6 is a block diagram showing a structure of a data flow type information processor according to one embodiment of the present invention.

FIG. 6 is a block diagram showing a structure of a data flow type information processor according to one embodiment of the present invention.

Figure 1:
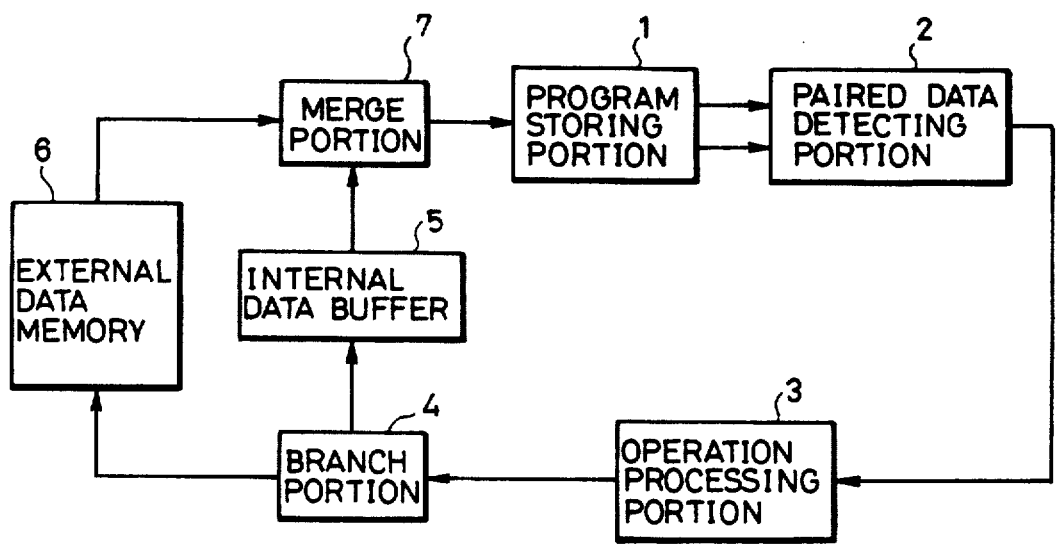
FIG. 1 is a block diagram showing a structure of a conventional data flow type information processor.
Figure 2:
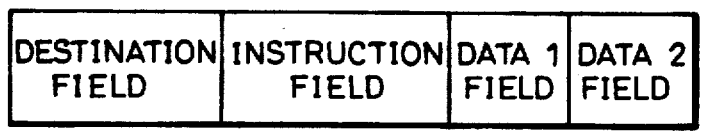
FIG. 2 is a diagram showing a structure of a data packet.
Figure 3:
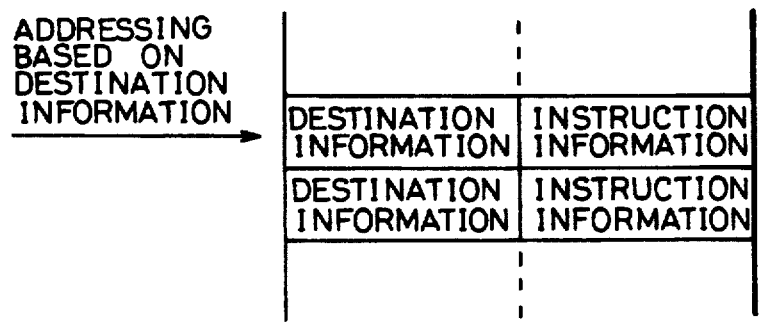
FIG. 3 is a diagram showing a part of the content stored in a program memory.
Figure 4:
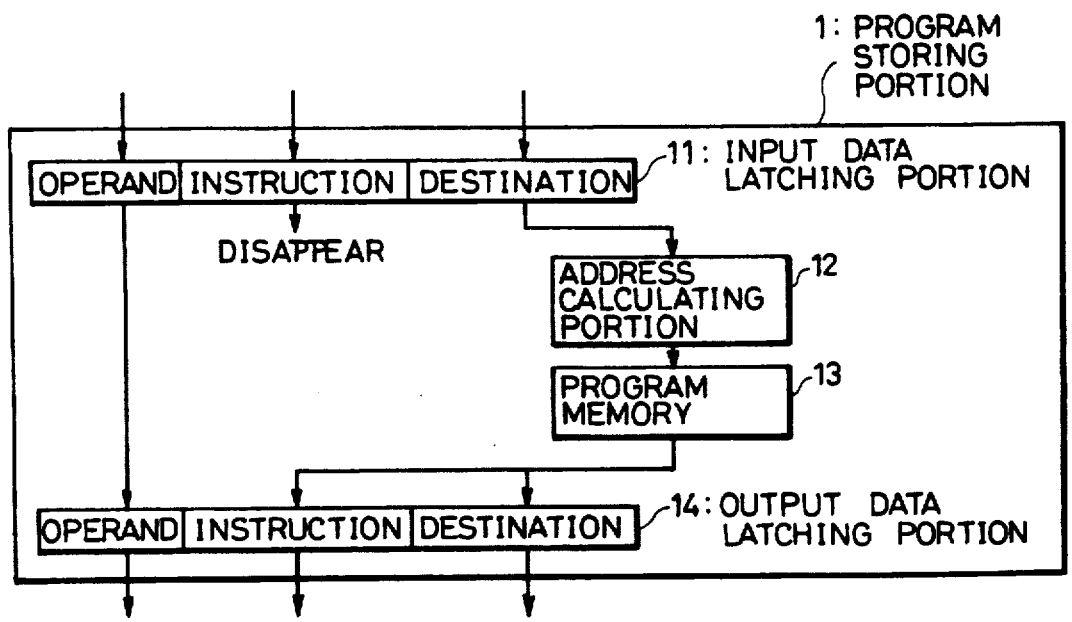
FIG. 4 is a block diagram showing a structure of a program storing portion in the data flow type information processor.
Figure 5:
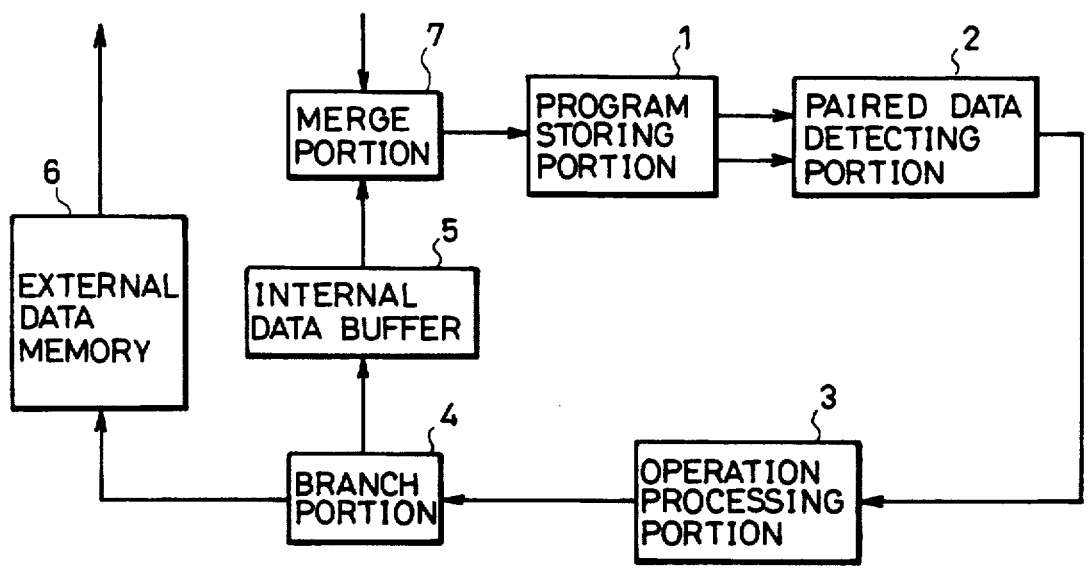
FIG. 5 is a block diagram showing another example of the data flow type information processor.

In FIG. 6, the connection of a program storing portion 1, a paired data detecting portion 2, an operation processing portion 3, a branch portion 4, an internal data buffer 5 and a merge portion 7 is the same as that in the conventional information processor shown in FIG. 1.

In the present embodiment, an output of the branch portion 4 is connected to one input of a merge portion 21, and an output of the merge portion 21 is connected to an input of a branch portion 22. In addition, one output of the branch portion 22 is connected to an input of an external data memory 6, an output of the external data memory 6 is connected to one input of a merge portion 23, and an output of the merge portion 23 is connected to an input of a branch portion 24. In addition, one output of the branch portion 24 is connected to one input of the merge portion 7 and the other output thereof is connected to the other input of the merge portion 21.

Figure 7:
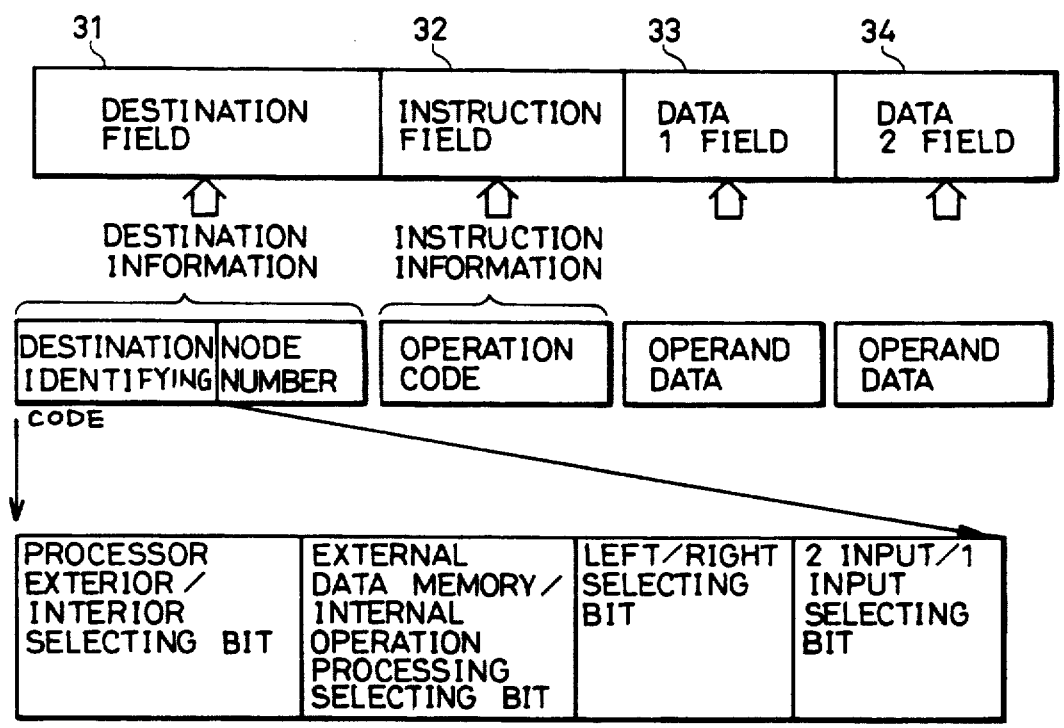
FIG. 7 is a diagram showing a structure of a data packet circulating through each portion of the information processor shown in FIG. 6.

FIG. 7 is a diagram showing a structure of a data packet circulating through each portion of the information processor shown in FIG. 6.

The data packet includes a destination field 31, an instruction field 32, a data 1 field 33 and a data 2 field 34. The destination field 31 stores destination information, and the instruction field 32 stores instruction information. The data 1 field 33 stores operand data (left data), and the data 2 field 34 stores operand data (right data). The destination information includes a destination identifying code, a node number and the like. The destination identifying code includes a processor exterior/interior selecting bit, an external data memory/internal operation processing selecting bit, a left/right data selecting bit and a 2 input /1 input selecting bit. The node number generally represents a number of a node (the number of a branch portion or a merge portion), while representing the number of an information processor and an entry node number of the information processor if the exterior of a processor is selected by the destination identifying code.

Figure 8:
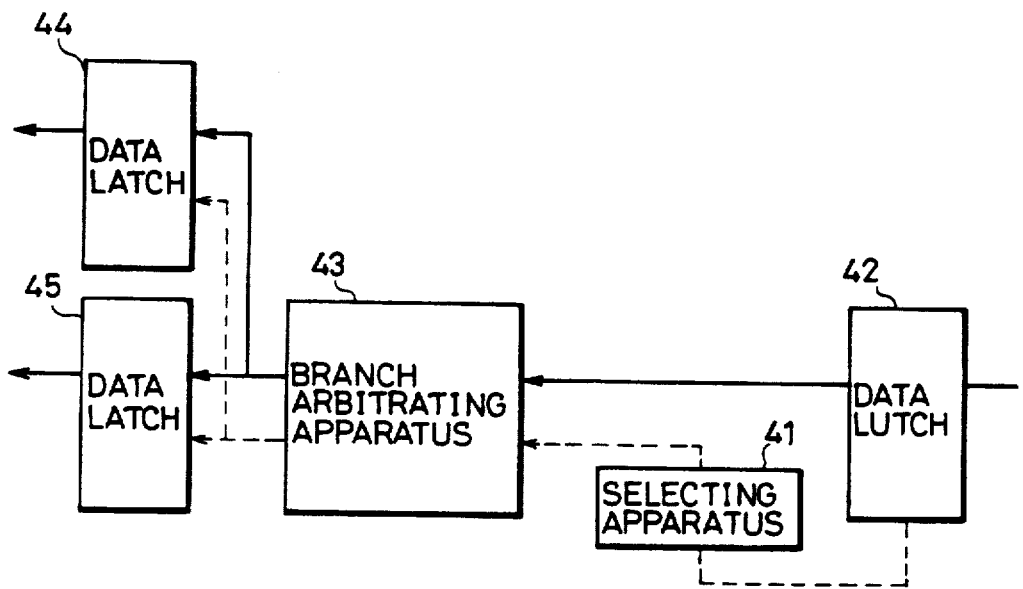
FIG. 8 is a block diagram showing a structure of a branch portion of the information processor shown in FIG. 6.

FIG. 8 is a block diagram showing one structure of the branch portions 4, 22 and 24. A selecting apparatus 41 determines the destination to be branched according to destination information in a data packet inputted to a data latch 42, to issue an instruction to a branch arbitrating apparatus 43. The branch arbitrating apparatus 43 transfers the data packet held in the data latch 42 to a data latch 44 or a data latch 45 in response to the instruction from the selecting apparatus 41.

Figure 9:
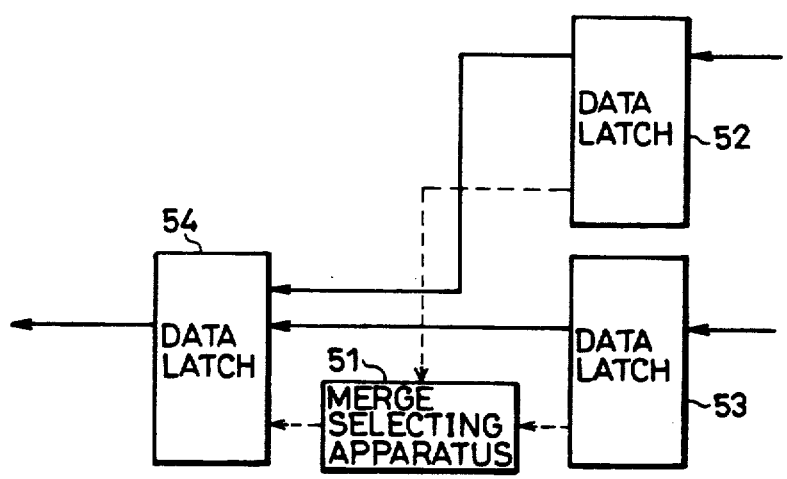
FIG. 9 is a block diagram showing a structure of a merge portion of the information processor shown in FIG. 6.

FIG. 9 is a block diagram showing one structure of the merge portions 7, 21 and 23 shown in FIG. 6. When data packets are inputted to data latches 52 and 53, a merge selecting apparatus 51 transfers the data packets to a data latch 54 in the order of arrival.

Description is now made of an operation of the information processor shown in FIG. 6.

A data packet processed by the operation processing portion 3 is applied to the branch portion 4. The branch portion 4 transfers the data packet to the internal data buffer 5 or the merge portion 21 according to the destination identifying code. For example, when the interior of a processor is selected by the processor exterior/interior selecting bit and internal operation processing is selected by the external data memory/internal operation processing selecting bit, the data packet is transferred to the internal data buffer 5.

The merge portion 21 transfers to the branch portion 22 the data packet from the branch portion 4 or a data packet from the branch portion 24 in the order of arrival. The branch portion 22 transfers the data packet from the merge portion 21 to the external data memory 6 or an external information processor according to the destination identifying code. For example, when the interior is selected by the processor exterior/interior selecting bit and an external data memory is selected by the external data memory/internal operation processing selecting bit, the data packet is transferred to the external data memory 6. When the exterior is selected by the processor exterior/interior selecting bit and internal operation processing is selected by the external data memory/internal operation processing selecting bit, the data packet is transferred to the exterior.

The merge portion 23 transfers to the branch portion 24 a data packet from the exterior or the data packet from the external data memory 6 in the order of arrival. The branch portion 24 transfers the data packet from the merge portion 23 to the merge portion 7 or 21 according to the node number thereof. In this case, the node number represents a number of an information processor. If the number coincides with a number of an information processor to which the data packet is inputted, the data packet is transferred to the merge portion 7. On the contrary, if both do not coincide with each other, the data packet is transferred to the merge portion 21.

Figure 10:
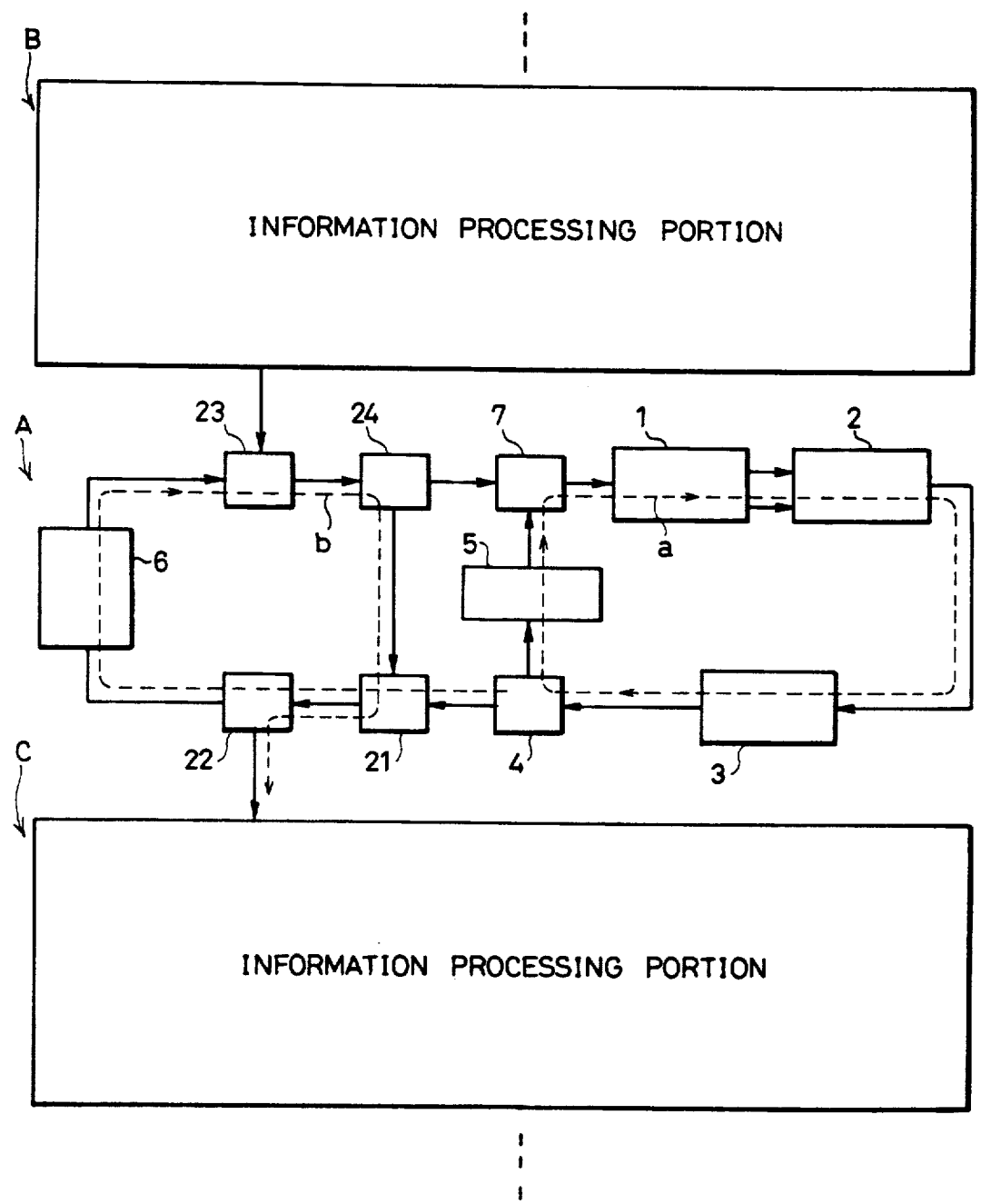
FIG. 10 is a diagram showing a structure of a multiprocessor system using the information processor shown in FIG. 6.

FIG. 10 is a diagram showing a structure of a part of a multiprocessor system using the information processor according to the present embodiment.

A data packet outputted from an information processor B is applied to a merge portion 23 of an information processor A, and data processed in the information processor A is applied to an information processor C from a branch portion 22.

If and when internal processing through an internal data buffer 5 is performed in the information processor A, the data packet is sent in the order of a program storing portion 1, a paired data detecting portion 2, an operation processing portion 3, a branch portion 4, an internal data buffer 5 and a merge portion 7, as represented by a broken line a. In addition, when the data packet is processed by an external data memory 6 and then, transferred to the information processor C, the data packet is sent to the external data memory 6 from the branch portion 4 through a merge portion 21 and the branch portion 22 and further sent to the information processor C from the external data memory 6 through the merge portion 23, a branch portion 24, the merge portion 21 and the branch portion 22, as represented by a broken line b.

Thus, the data packet processed by the external data memory 6 is quickly sent to the information processor C without passing through an internal path such as the program storing portion 1. In addition, since internal processing through the internal data buffer 5 and processing from the external data memory 6 to the exterior are not merged, the internal processing is not delayed. Furthermore, when the data packet processed by the external data memory 6 is sent to the merge portion 7 through the merge portion 23 and the branch portion 24, internal processing through the external data memory 6 is performed.

The data flow type information processor having the above described structure is effective if the result of processing by the external data memory 6 is referenced by another information processor.

Figure 11:
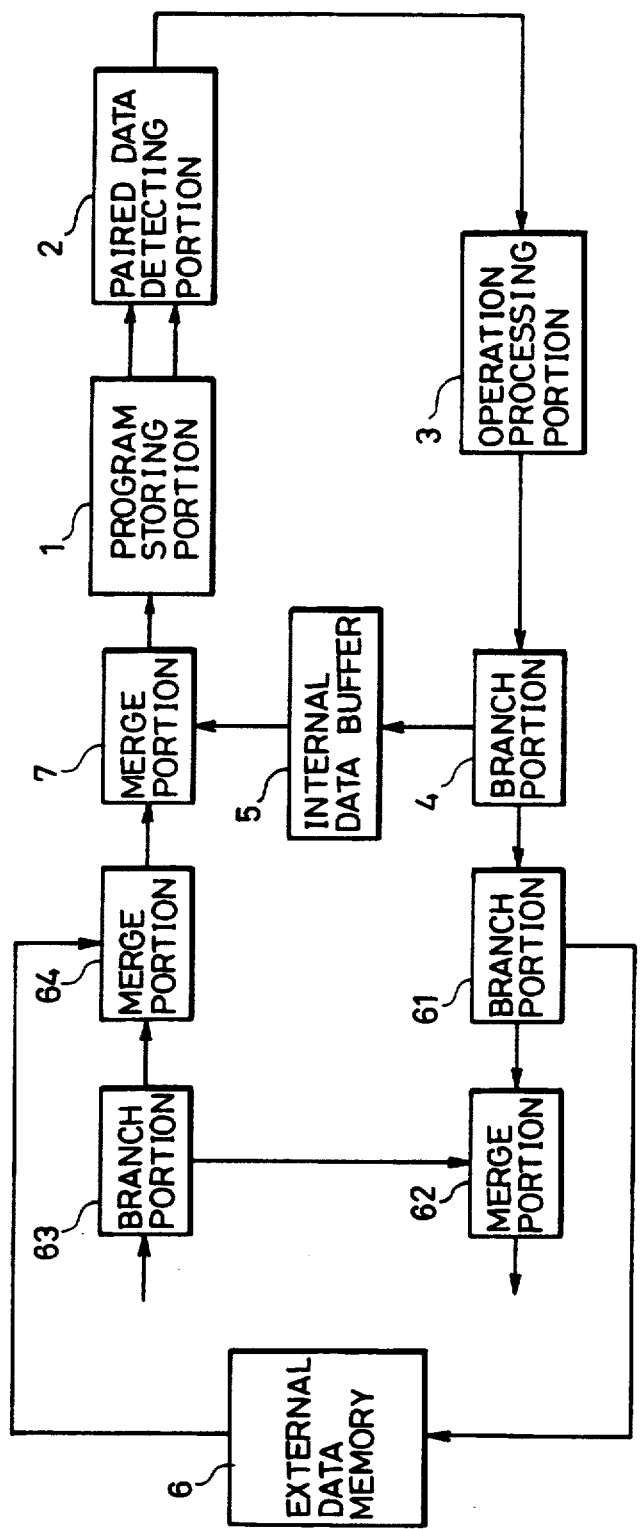
FIG. 11 is a block diagram showing a structure of a data flow type information processor according to another embodiment of the present invention.

FIG. 11 is a block diagram showing the structure of a data flow type information processor according to another embodiment of the present invention.

In the present embodiment, an output of a branch portion 4 is connected to an input of a branch portion 61. In addition, one output of the branch portion 61 is connected to an input of an external data memory 6 and the other output thereof is connected to one input of a merge portion 62. Furthermore, an output of the external data memory 6 is connected to one input of a merge portion 64. An output of the merge portion 64 is connected to an input of a merge portion 7. One output of a branch portion 63 is connected to the other input of the merge portion 64 and the other output thereof is connected to the other input of the merge portion 62.

A structure of the branch portions 61 and 63 and a structure of the merge portions 62 and 64 are respectively the same as those shown in FIGS. 8 and 9.

Description is now made on an operation of the information processor shown in FIG. 11.

A data packet processed by an operation processing portion 3 is applied to a branch portion 4. The branch portion 4 transfers the data packet to an internal data buffer 5 or the branch portion 4 according to a destination identifying code. For example, when the interior is selected by a processor exterior/interior selecting bit and an internal operation processing is selected by an external data memory/internal operation processing selecting bit, the data packet is transferred to the internal data buffer 5.

The branch portion 61 transfers the data packet from the branch portion 4 to the external data memory 6 or the merge portion 62 according to the destination identifying code. For example, when the interior is selected by the processor exterior/interior selecting bit and an external data memory is selected by the external data memory/internal operation processing selecting bit, the data packet is transferred to the external data memory 6. On the other hand, when the exterior is selected by the processor exterior/interior selecting bit and the internal operation processing is selected by the external data memory/internal operation processing selecting bit, the data packet is transferred to the merge portion 62. The merge portion 62 outputs to the exterior the data packet from the branch portion 61 or a data packet from a branch portion 63 in the order of arrival.

The branch portion 63 transfers an externally applied data packet to the merge portion 62 or 64 according to the node number thereof. In this case, the node number represents a number of an information processor. When the number coincides with a number of an information processor to which the data packet is inputted, the data packet is transferred to the merge portion 64. On the contrary, when both do not coincide with each other, the data packet is transferred to the merge portion 62. The merge portion 64 transfers to the merge portion 7 the data packet from the external data memory 6 or the data packet from the branch portion 63 in the order of arrival. The branch portion 7 transfers to a program storing portion 1 the data packet from the merge portion 64 or the data packet from the internal data buffer 5 in the order of arrival.

Figure 12:
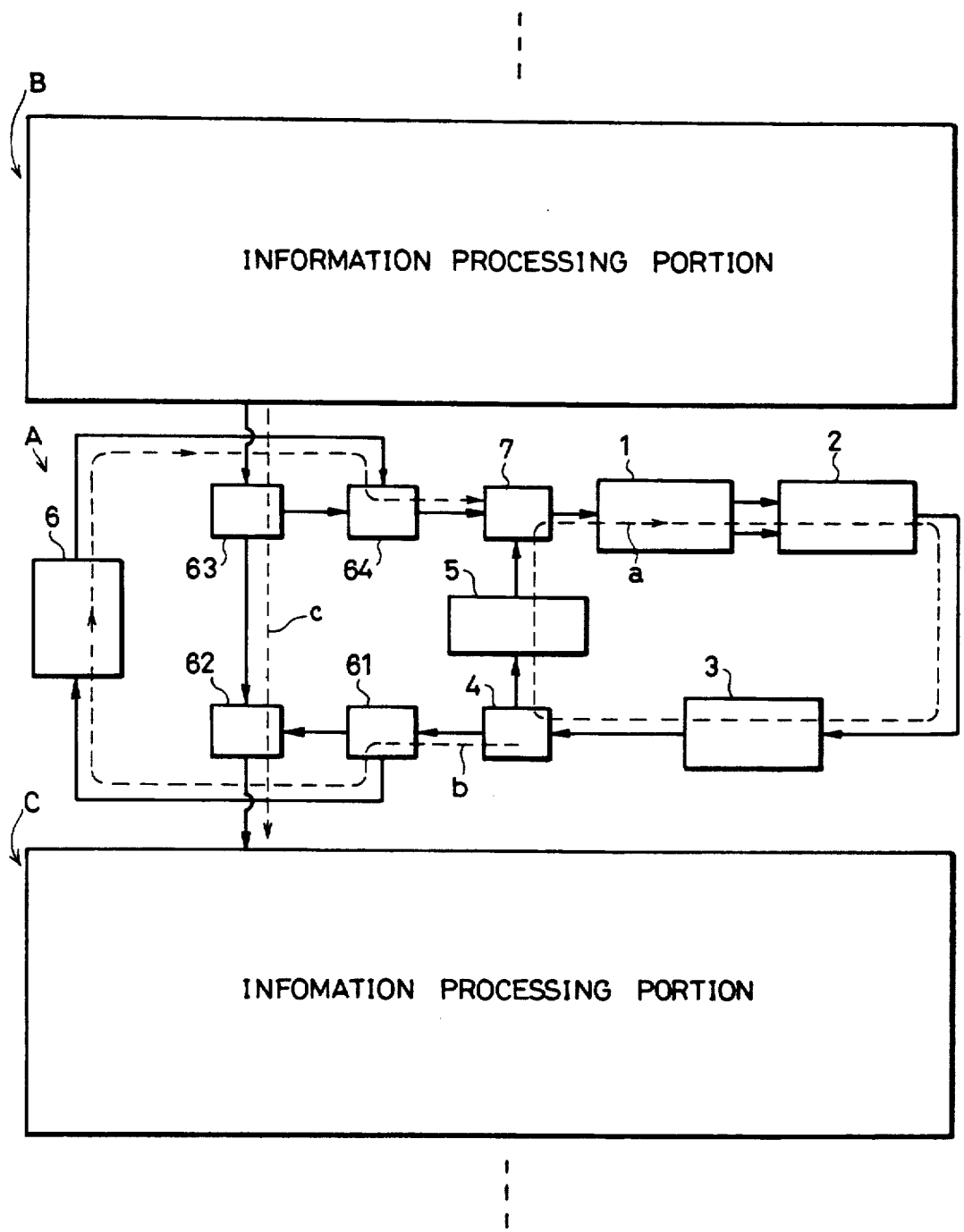
FIG. 12 is a diagram showing a structure of a multiprocessor system using the information processor shown in FIG. 11.

FIG. 12 is a diagram showing a structure of a part of a multiprocessor system using the information processor according to the present embodiment.

A data packet outputted from an information processor B is applied to a branch portion 63 of an information processor A, and data processed in the information processor A is applied to an information processor C from a merge portion 62.

If and when when internal processing through an internal data buffer 5 is performed in the information processor A, a data packet is sent in the order of a program storing portion 1, a paired data detecting portion 2, an operation processing portion 3, a branch portion 4, an internal data buffer 5 and a merge portion 7, as represented by a broken line a. In addition, when internal processing through an external data memory 6 is performed, the data packet applied to the branch portion 4 is sent in the order of a branch portion 61, the external data memory 6, a merge portion 64 and the merge portion 7, as represented by a broken line b. Furthermore, when the data packet applied from the information processor B is sent to the information processor C without passing through the internal processing, the data packet from the information processor B is applied to the branch portion 63, to be sent to the information processor C through the merge portion 62, as represented by c.

Thus, the externally applied data packet is quickly sent to another information processor without passing through an internal path such as the program storing portion 1. In addition, since processing from another information processor to still another information processor and the internal processing are not merged, the flow of the internal processing is not disturbed, so that the speed of processing is increased.

The data flow type information processor having the above described structure is effective particularly if the processing through the external data memory 6 is closed in the information processor.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data flow type information processor in which data is processed by a data flow program, comprising:

internal processing means for performing operation processing of data by the data flow program comprising a plurality of destination information and a plurality of instruction information corresponding thereto;

external storing means for storing data comprising a data packet including a destination field for storing destination information, an instruction field for storing instruction information and first and second fields for storing data;

first merge means for receiving data from said external storing means;

first branch means for receiving the data from said first merge means;

second merge means for receiving the data from said internal processing means; and second branch means for receiving the data from said second merge means;

said first merge means selectively applying to said first branch means the data applied from said external storing means or data applied from an external source to the information processor;

said first branch means selectively applying to said internal processing means or said second merge means the data applied from said first merge means;

said second merge means selectively applying to said second branch means the data applied from said first branch means or the data applied from said internal processing means;

said second branch means selectively outputting the data applied from said second merge means to said external storing means or said external source to the information processor;

said internal processing means including, program storing means for storing said data flow program, said program storing means reading out any one of the destination information and any one of the instruction information from said data flow program by addressing based on destination information in a destination field of an inputted data packet, storing the information in the destination field and an instruction field of the data packet, respectively, and outputting the data packet, paired data generating means for queuing data packets outputted from said program storing means, said paired data generating means detecting two data packets having the same destination information out of the inputted data packets, storing data in a first data field of one data packet and in a second data field of the other data packet, and outputting the other data packet, and operation means for receiving the data packet outputted from said paired data generating means for performing operation processing with respect to the data packet, said operation means decoding instruction information in the instruction field of said data packet, performing predetermined operation processing with respect to the data in said first and second data fields, storing the result of the processing in one of the data fields of the data packet, and outputting the data packet.

2. The data flow type information processor according to claim 1, wherein each of said first and second branch means comprises first holding means for receiving said data packet for holding the same, selecting means for generating a selection signal based on the destination information in the destination field of the data packet held in said first holding means, second and third holding means, and branch arbitrating means responsive to said selection signal for selectively transferring to said second or third holding means the data packet outputted from said first holding means, each of said second and third holding means holding the data packet from said branch arbitrating means.

3. The data flow type information processor according to claim 1, wherein each of said first and second merge means for comprises first and second holding means each receiving said data packet for holding the same, third holding means, and selecting means for transferring to said third holding means the data packets held in said first and second holding means in the order of arrival, said third holding means holding the data packets transferred by said selecting means.

4. The data flow type information processor according to claim 1, wherein said data applied from said external source is applied from a second information processor, and said data outputted to said external source is applied to a third information processor.

5. A data flow type information processor in which data is processed by a data flow program, comprising:

internal processing means for performing operation processing of data by the data flow program comprising a plurality of destination information and a plurality of instruction information corresponding thereto;

external storing means for storing data comprising a data packet including a destination field for storing destination information, an instruction field for storing instruction information, and first and second data fields for storing data;

first branch means for receiving data from an external source to the information processor;

first merge means for receiving the data from said first branch means;

second branch means for receiving the data from said internal processing means; and second merge means for receiving the data from said second branch means;

said first branch means selectively applying to said first merge means or said second merge means the data applied from said external source;

said first merge means selectively applying to said internal processing means the data applied from said external storing mens or the data applied from said first branch means;

said second branch means selectively applying to said external storing means or said second merge means the data applied from said internal processing means;

said second merge means selectively outputting to said external source the data applied from said second branch means or the data applied from said first branch means;

said internal processing means including, program storing means for storing said data flow program, said program storing means reading out any one of the destination information and any one of the instruction information from said data flow program by addressing based on destination information in a destination field of an inputted data packet, storing the information in the destination field and an instruction field of the data packet, and outputting the data packet, paired data generating means for queuing data packets outputted from said program storing means, said paired data generating means detecting two data packets having the same destination information out of the inputted data packets, storing data in a first data field of one data packet in a second field of the other data packet, and outputting the other data packet, and operation means for receiving the data packet outputted from said paired data generating means for performing operation processing with respect to the data packet, said operation means decoding instruction information in the instruction field of said data packet, performing predetermined operation processing with respect to the data in said first and second data fields, storing the result of the processing in one of the data fields of the data packet, and outputting the data packet.

6. The data flow type information processor according to claim 5, wherein each of said first and second branch means for comprises first holding means receiving said data packet for holding the same, selecting means for generating a selection signal based on the destination information in the destination field of the data packet held in said first holding means, second and third holding means, and branch arbitrating means responsive to said selection signal for selectively transferring to said second or third holding means the data packet outputted from said first holding means, each of said second and third holding means holding the data packet from said branch arbitrating means.

7. Data flow type information processor according to claim 5, wherein each of said first and second merge means comprises first and second holding means for each receiving said data packet for holding the same, third holding means, and selecting means for transferring to said third holding means the data packets held in said first and second holding means in the order of arrival, said third holding means holding the data packet transferred by said selecting means.

8. The data flow type information processor according to claim 5, wherein said data from said external source is applied from a second information processor, and said data outputted to said external source is applied to a third information processor.

9. A data flow type information processor in which data is processed by a data flow program, comprising:

internal processing means for performing operation processing of data by the data flow program comprising a plurality of destination information and a plurality of instruction information corresponding thereto;

external storing means for storing data comprising a data packet including a destination field for storing destination information, an instruction field for storing instruction information and first and second fields for storing data;

merge means for applying to said internal processing means or branch means the data from said external storing means or data from an external source; and said branch means for applying to said external storing means or said external source the data from said merge means or the data from said internal processing means;

said internal processing means including, program storing means for storing said data flow program, said program storing means reading out any of the destination information and any one of the instruction information from said data flow program by addressing based on destination information in a destination field of an inputted data packet, storing the information in the destination field and an instruction field of the data packet, respectively, and outputting the data packet, paired data generating means for queuing data packets outputted from said program storing means, said paired data generating means detecting two data packets having the same destination information out of the inputted data packets, storing data in a first data field of one data packet and in a second data field of the other data packet, and outputting the other data packet, and operation means for receiving the data packet outputted from said paired data generating means for performing operation processing with respect to the data packet, said operation means decoding instruction information in the instruction field of said data packet, performing predetermined operation processing with respect to the data in said first and second data field, storing the result of the processing in one of the data fields of the data packet, and outputting the data packet.

10. A data processing method in a data flow type information processor comprising internal processing means for performing operation processing of data by a data flow program comprising a plurality of destination information and a plurality of instruction information corresponding thereto, external storing means for storing data comprising a data packet including a destination field for storing destination information, an instruction field for storing instruction information and first and second fields for storing data, first and second merge means, and first and second branch means, comprising the steps of:

(a) reading out any one of the destination information and any one of the instruction information from said data flow program by addressing based on destination information in a destination field of an inputted data packet;

(b) storing the information in the destination field and an instruction field of the data packet, respectively;

(c) outputting the data packet;

(d) detecting two data packets outputted at said step (c) having the same destination information out of the inputted data packets for queuing the data packets;

(e) storing data in a first data field of one data packet and in a second data field of the other data packet;

(f) outputting the other data packet;

(g) receiving the other data packet outputted at said step (f);

(h) decoding instruction information in the instruction field of said data packet;

(i) performing predetermined operation processing with respect to the data in said first and second data fields;

(j) storing the result of the processing in one of the data fields of the data packet;

(k) outputting the data packet;

(l) selectively applying the data applied from said external storing means or data applied from an external source to said first branch means through said first merge means;

(m) selectively applying the data applied from said first merge means to said internal processing means or said second merge means through said first branch means;

(n) selectively applying the data applied from said first branch means or the data applied from said internal processing means to said second branch means through said second merge means; and (o) selectively outputting the data applied from said second merge means to said external storing means or said external source through said second branch means.

11. A data processing method in a data flow type information processor comprising internal processing means for performing operation processing of data by a data flow program comprising a plurality of destination information and a plurality of instruction information corresponding thereto; external storing means for storing data comprising a data packet including a destination field for storing destination information, an instruction field for storing instruction information and first and second fields for storing data, first and second merge means, and first and second branch means, comprising the steps of:

(a) reading out any one of the destination information and anyone of the instruction information from said data flow program by addressing based on destination information in a destination field of an inputted data packet;

(b) storing the information in the destination field and an instruction field of the data packet, respectively;

(c) outputting the data packet;

(d) detecting two data packets outputted at said step (c) having the same destination information out of the inputted data packets for queuing the data packets;

(e) storing data in a first data field of one data packet and in a second data field of the other data packet;

(f) outputting the other data packet;

(g) receiving the other data packet outputted at said step (f);

(h) decoding instruction information in the instruction field of said data packet;

(i) performing predetermined operation processing with respect to the data in said first and second data fields;

(j) storing the result of the processing in one of the data fields of the data packet;

(k) outputting the data packet;

(l) selectively applying the data applied from said external storing means to said first merge means or said second merge means through said first branch means;

(m) selectively applying the data applied from said external storing means or the data applied from said first branch means to said internal processing means through said second branch means;

(n) selectively applying the data applied from said internal processing means to said external storing means or said second merge means through said second branch means; and (o) selectively outputting the data applied from said second branch means or the data applied from said first branch means to an external source through said second merge means.

* * * * *